UNITED STATES PATENT OFFICE.

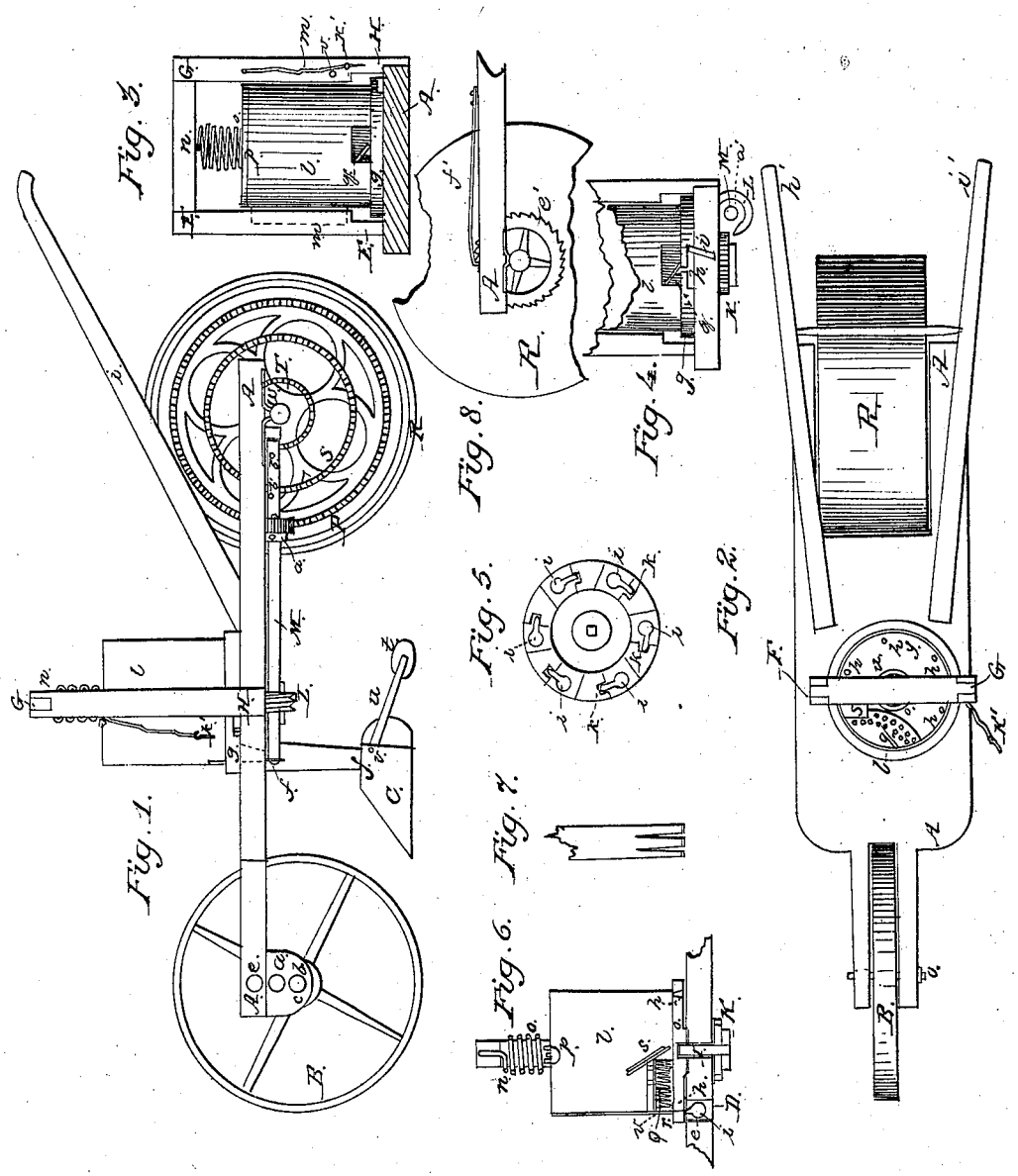

THOS. J. LEWIS AND GEO. F. LEWIS, OF BOSTON, MASSACHUSETTS.

IMPROVEMENT IN THE CONSTRUCTION OF SEED-PLANTERS.

Specification forming part of Letters Patent No. 1,661, dated June 27, 1840.

*To all whom it may concern:*

Be it known that we, THOMAS J. LEWIS and GEORGE F. LEWIS, both of Boston, in the county of Suffolk and State of Massachusetts, have invented new and useful Improvements in Seed-Planters, of which the following is a specification.

The said improvements, the principles thereof, and manner in which we have contemplated the application of the same, by which they may may be distinguished from other inventions of a similar nature, together with such parts or combinations as we claim as our invention and hold to be original and new, we have herein described and set forth. The said description, taken in connection with the accompanying drawings, herein referred to, composes our specification.

The figures of the accompanying plate of drawings represent our improvements.

Figure 1 is a side elevation of our machine. Fig. 2 is a plan of the same, Figs. 3, 4, 5, 6, 7, 8 being detailed views of some of the important parts.

A A is a long beam or frame to which the several working parts of the machine are attached.

A guide-roller, B, is arranged in the front of the beam A A and revolves on a proper pin, $b$, Figs. 1 and 2, by changing which pin from the hole $c$ and passing it through either of the holes $d\ e$ the roller may be adjusted to different depths.

The tooth or plowshare C is situated a little distance behind the guide-roller B, and is attached to the bottom of a conducting-pipe, $ff$, of triangular shape. The tooth or plowshare C is so constructed as to turn the earth over on one side only, one side of the tooth being straight and perpendicular to the surface of the earth, and the other curved in the usual manner so as to displace the soil from the furrow, the depth of the furrow being regulated by changing the guide-roller B, as before described. The conducting-pipe $ff$ communicates with a hole or opening, D, in the beam A A. (Shown by dotted lines in Fig. 1.) The edge of a horizontal circular plate, $g$, is placed and revolves over the opening D. The plate $g$ has a square hole in the center, which fits on the top of an upright arbor, I, Fig. 6, which arbor is properly arranged with shoulders, so as to revolve in a proper space cut through the beam A A. The arbor I is revolved by means of the cogged pinion K, Figs. 4 and 6, firmly fixed on said arbor beneath the beam A A. An endless screw, L, on the revolving shaft M engages with the teeth of the cogged pinion K and turns said pinion. The shaft M has proper supports or bearings in which it rests and revolves, the revolution of the shaft being produced by the cogged pinion O, Fig. 1, engaging with the teeth on the wheel P, which operation will be more particularly described hereinafter. The plate $g$ has any suitable number of proper-shaped apertures $h\ h\ h\ h$, Figs. 2, 4, 6, cut through the same, said holes being larger at the bottom than at the top, as shown in Fig. 2. Valves $i\ i\ i\ i$, &c., Figs. 4, 5, and 6, are fitted in proper spaces cut out, as shown in Fig. 5, from the under side of the plate $g$, directly beneath the holes $h\ h\ h\ h$, the bottom of the plate and that of each of the valves being together in a plane surface when the valves are closed. These valves are arranged with small pins or joints at one of their ends, as shown at $k\ k\ k$, &c., Fig. 5, on which they turn loosely, and, being weighted, or composed of iron or some other appropriate and heavy material, they will drop freely downward when they pass over the opening D in revolving; but when passing over the upper surface of the beam A A they remain in their seats, or will be kept in close proximity to the mouths of the holes $h\ h\ h\ h$. A hopper or seed-receptacle, $l\ l$, Figs. 1, 2, 3, 4, 6, fits or rests on the top of the plate $g$, so that the plate may revolve independently of the hopper. This hopper is a cylinder of metal or other proper material or form of less diameter than the plate $g$. It has projections $m\ m$, Fig. 3, on its opposite sides, which enter and play in suitable grooves in the inside of the upright frame E F G H, Figs. 1 and 3, the said frame being properly secured to the beam A A. One end, $n$, of a wound circular spring, $n\ o$, Figs. 1, 2, 3, and 6, is properly attached to the under side of the cross-beam F G. The other end, $o$, presses on the top of a cross-bar, $p$, of the hopper $l$, Figs. 3 and 6. This spring serves to keep the bottom of the hopper in close contact with the upper surface of the plate $g$ when said plate revolves. A brush, $q$, Figs. 2, 3, 4, 6, is attached to the periphery or interior of the hopper, and in the rear or directly behind the same is a spring, $r$, having several prongs, as shown in Fig. 7, which lie upon and over the seed receptacles or apertures h h, &c., as they are successively brought under the same by the revolutions of the plate g. The other end of said spring is properly affixed or secured to the inside of the hopper. A stationary scraper, S, Figs. 2 and 3, is suitably arranged before the brush to prevent too great a quantity of the seed in the hopper from passing underneath the brush.

Now, suppose seed to be placed in the hopper l, the circular plate g being revolved, as before described, the apertures h h h, &c., will be filled with seed, which seed will rest on the top of the valves i i i i, and as those parts of the plates in which the apertures h h are formed pass round beneath the edge of the scraper S and the face or bottom of the brush q the great body or quantity of seed will be turned aside, and the small quantities only, which have fallen into the apertures, will be permitted to pass, and when these apertures arrive at or are fairly over the opening D and conducting-pipe f f the valves i i i i, thus being relieved, will drop freely, as has been before mentioned, thereby allowing the seed to fall through the conducting-pipe into the furrow below the same. It will be seen that the free dropping of the seed is assisted by the beveling or conical shape of the apertures before mentioned, the certainty of dropping the seed being secured by the prongs of the spring r over the hole or apertures h h, &c., which prongs, snapping into said apertures as the plate revolves, force the seed out whenever there is any tendency to clog. After the seed is deposited in the furrow the earth, which has been removed from the same, is replaced by means of the single coverer, Fig. 1, attached to the end of the arm U, the other end of said arm being joined or properly attached to the inside of the tooth C by a pin, V, on which it vibrates vertically. The position of the arm U is oblique to the line of the beam A A and the furrow as formed, and the cover being set obliquely to the arm U, and the whole rising or falling or adjusting itself by its own weight, it will be seen that the displaced earth will be drawn back to the furrow. After the earth is thus returned to the furrow it is smoothed over by the roller R, whose journals revolve in suitable bearings or boxes, W, &c., at the back part of the beam.

The toothed wheel P, before mentioned, or series of wheels P S T, of different diameter, is arranged on one circular frame affixed in the side of the roller R, which frame, being firmly fixed to one of the journals of the roller R, revolves with said roller. The teeth of these wheels are formed, as seen in Fig. 1, on the sides of their circumferences, forming, as it were, vertical crown-wheels, and the teeth of the pinion O, engaging with those of either of the different wheels, will be revolved, at the same time revolving the shaft M on which said pinion is fixed. The pinion O has a collar, a', on one side, through which a hole is drilled. A pin is inserted in this hole and passes through a corresponding hole in the shaft M M, as shown at b'. By taking out or removing the pin and slipping the pinion O along on the shaft until the hole in the collar a' comes opposite the holes b' b' in the shaft, and passing the pin through the holes in the collar and shaft, the pinion may be thereon adjusted to either of the three positions at pleasure and made to engage with either of the wheels P S T. By this arrangement it will be seen that the number of revolutions of the shaft M during one revolution of the roller R may be varied at pleasure, according to the number of teeth of the wheels P S T, and consequently the number of revolutions of the plate g (while the machine is passing over a length of surface equal to the circumference of the roller R) will likewise be varied, so that the distance between the deposits of the seed will be varied or regulated accordingly.

The machine may be adapted to different kinds of seed by removing the plate g and substituting others having holes or apertures of a different size and a greater or less number of these holes. The plate g may be removed by raising the hopper, which is done by lifting the cross-piece p, thereby compressing the wound circular spring n o, when the plate can be easily taken from the arbor I and another placed thereon.

It will likewise be seen that when it is desired the seed may be easily removed from the hopper by raising the same, as above described, and turning the machine over a little to one side or the other. The hopper, when raised, may be kept up by inserting a pin, k, in a proper hole, l'', Fig. 3, in the frame H I, beneath either of the projections m.

When the machine is drawn backward the seed is prevented from dropping by the ratchet-wheel e' and catch f', attached to the end of the roller R, (see Fig. 8,) which checks the revolutions of the roller, and consequently of the system of wheels, pinions, &c., which revolves the plate g.

The hole l' in the front part of the hopper enables the operator to remedy any little difficulty which may occur in the dropping apparatus and in most cases remove any obstacle which may be presented to the free dropping of the seed.

The machine is wielded or directed by the plowman by means of the handles h' i', properly secured to the beam A A.

It will be observed that the main improvements of our machinery are in the dropping apparatus. In most machines where there is a revolving horizontal plate the operation is generally injured by the seed getting beneath the plate and checking its revolutions. This objection, it will be perceived, is remedied in our invention by making the plate of larger diameter than the hopper and by arranging the valves in the bottom of the plate, as described.

Another advantage of our machinery is that it requires less nicety in the construction than those heretofore used, as the rotary plate is not to be fitted to the inside of the hopper, and notwithstanding the parts should not revolve exactly true the machinery would accomplish its object.

Having thus described our improvements, we shall now proceed to specify such parts or combinations as we claim as our invention—

1. A rotary plate larger in diameter than the hopper and formed with valves under each beveled aperture or seed-receptacle to keep the seed from clogging or getting under the plate, in combination with a hopper which is pressed down on the upper surface of said rotary plate (in order to prevent the seed from escaping during the revolution of the plate) by a spring, as above described, the whole being arranged and operating together substantially in the manner and for the purposes hereinbefore set forth.

2. The peculiar combination of the machinery which revolves the horizontal plate and thereby regulates the dropping or discharge of the seed from the hopper, said combination consisting of the series of toothed or gear wheels P S T, movable pinion O on the shaft M, endless screw L, and pinion K, attached or connected to the arbor I of the horizontal plate, the whole being arranged and operating together substantially in the manner and for the purposes hereinbefore set forth and described.

In testimony that the above is a true description of our said invention and improvements we have hereto set our signatures this 12th day of May, in the year 1840.

THOMAS J. LEWIS.
GEORGE F. LEWIS.

Witnesses:
  R. H. EDDY,
  E. LINCOLN, Jr.